United States Patent
Chassard et al.

(10) Patent No.: US 10,193,479 B2
(45) Date of Patent: Jan. 29, 2019

(54) DEVICE FOR CONTROLLING A REGULATOR OF A MOTOR VEHICLE ALTERNATOR, AND ALTERNATOR COMPRISING THE CORRESPONDING REGULATOR

(71) Applicant: Valeo Equipements Electriques Moteur, Creteil (FR)

(72) Inventors: Pierre Chassard, Creteil (FR); Pierre Tisserand, Limeil Brevannes (FR); Laurent De Lamarre, Paris (FR); Thibault Arrou, Suresnes (FR)

(73) Assignee: Valeo Equipements Electriques Moteur, Creteil (FR)

( * ) Notice: Subject to any disclaimer, the term of this patent is extended or adjusted under 35 U.S.C. 154(b) by 114 days.

(21) Appl. No.: 15/515,792

(22) PCT Filed: Sep. 29, 2015

(86) PCT No.: PCT/FR2015/052599
§ 371 (c)(1),
(2) Date: Mar. 30, 2017

(87) PCT Pub. No.: WO2016/051075
PCT Pub. Date: Apr. 7, 2016

(65) Prior Publication Data
US 2017/0310259 A1    Oct. 26, 2017

(30) Foreign Application Priority Data
Sep. 30, 2014 (FR) ...................................... 14 59227

(51) Int. Cl.
*H02P 9/02* (2006.01)
*H02J 7/14* (2006.01)
(Continued)

(52) U.S. Cl.
CPC .............. *H02P 9/02* (2013.01); *H02J 7/1492* (2013.01); *H02K 11/30* (2016.01); *H02J 7/166* (2013.01);
(Continued)

(58) Field of Classification Search
None
See application file for complete search history.

(56) References Cited

U.S. PATENT DOCUMENTS 4,000,453 A * 12/1976 Sheldrake .......... G01R 19/1658
322/99
4,323,837 A * 4/1982 Nakamura ............ H02J 7/1476
307/10.7
(Continued)

FOREIGN PATENT DOCUMENTS

| EP | 0720271 A1 | 7/1996 |
|---|---|---|
| EP | 0783994 A1 | 7/1997 |

(Continued)

*Primary Examiner* — Bentsu Ro
(74) *Attorney, Agent, or Firm* — Berenato & White, LLC

(57) ABSTRACT

A regulator has a circuit generating an activation command by bringing, to a first voltage higher than a high reference voltage, a bidirectional line connected to a detection circuit for detecting a status of the activation command. The detection circuit comprises generation means for generating a fault signal from a flag indicating a failure of the alternator, linking the line to a ground by means of a switching element, thus bringing the line to a second voltage lower than a fault voltage lower than the high reference voltage, and the control circuit comprises detection means for detecting the fault signal. The control circuit further transmits a setpoint PWM signal having a maximum higher than the high reference voltage and a minimum lower than a low reference voltage higher than the fault voltage, a duty ratio of the setpoint signal being representative of a setpoint voltage (V0) of the regulator.

20 Claims, 4 Drawing Sheets

(51) Int. Cl.
   *H02K 11/30*    (2016.01)
   *H02J 7/16*     (2006.01)
   *H02P 101/45*   (2016.01)

(52) U.S. Cl.
   CPC ...... *H02K 2211/00* (2013.01); *H02P 2101/45* (2015.01); *Y02T 10/92* (2013.01)

(56) References Cited

U.S. PATENT DOCUMENTS

| | | | | |
|---|---|---|---|---|
| 4,584,515 | A | * | 4/1986 | Edwards .................. H02J 7/24 307/10.1 |
| 5,294,881 | A | | 3/1994 | Pierret et al. |
| 5,523,672 | A | * | 6/1996 | Schramm .............. H02J 7/1476 322/25 |
| 2012/0286744 | A1 | * | 11/2012 | Tunzini ................ H02J 7/1461 322/24 |

FOREIGN PATENT DOCUMENTS

| | | |
|---|---|---|
| EP | 0822654 A2 | 2/1998 |
| FR | 2674063 A1 | 9/1992 |
| FR | 2724268 A1 | 3/1996 |

* cited by examiner

DEVICE FOR CONTROLLING A REGULATOR OF A MOTOR VEHICLE ALTERNATOR, AND ALTERNATOR COMPRISING THE CORRESPONDING REGULATOR

CROSS-REFERENCE TO RELATED APPLICATIONS AND CLAIM TO PRIORITY

This application is a national stage application of International Application No. PCT/FR2015/052599 filed Sep. 29, 2015, which claims priority to French Patent Application No. 1459227 filed Sep. 30, 2014, the disclosures of which are incorporated herein by reference and to which priority is claimed.

FIELD OF THE INVENTION

The present invention relates to a device for controlling a regulator of a motor vehicle alternator, as well as the alternator comprising the regulator designed for this control device.

BACKGROUND OF THE INVENTION

Conventionally, a regulator of a motor vehicle alternator is put into service on the initiative of the driver by means of a contact key of the vehicle. With a so-called "mono-function" regulator, the regulator is connected to the contact key via a fault indicator lamp.

In more sophisticated regulators, such as so-called "multi-function" or controlled regulators, the regulator circuitry is supplied with power continually, but must go from a state of rest or standby, of reduced consumption, to an active state, when it is detected that the contact key is closed.

However, in order to obtain compatibility of wiring of these multi-function regulators with multi-function regulators, it is not possible to provide a direct connection between the contact key and the regulator, which makes it necessary to detect closure of the key by means of the fault indicator lamp.

In practice, the central problem of detection of this type consists of the distinction which must be made between the case in which the key is open and the lamp is off, in which case a terminal of the lamp on the regulator side is at the potential of a ground because of a pull-up resistance, and the case when the key is closed but, the lamp is lit because of the existence of a fault, in which case the terminal of the lamp on the regulator side is at a potential which is fixed, for example by a voltage drop of a semiconductor switching element which supplies the lamp with power. The smaller this voltage drop, the more the potential of the lamp terminal on the regulator side is close to that of the ground, which makes it difficult to distinguish between the open and closed states of the key.

In patent application FR2674063, the company VALEO EQUIPEMENT ELECTRIQUES MOTEUR solves this problem by implementing in a detection circuit a differential amplifier which controls the semiconductor switching element of the lamp by means of a difference between a voltage level of the terminal of the lamp on the regulator side, and a reference level, such as to maintain the potential of this terminal at a level which is sufficient not to deactivate the regulator when the alternator has a fault, but the contact key is closed.

The distinction between the open and closed states of the key is also made difficult by the existence of a leakage resistance between a terminal of the battery which supplies the lamp, and the terminal of the lamp on the regulator side which short-circuits the contact key.

A leakage resistance of this type, which is liable to appear in particular under the effect of conductive deposits, such as saline bridges which are created when the vehicle is exposed to salt spray, can have a value of 10 K$\Omega$, or could be as low as 1 K$\Omega$.

The variable nature of this leakage resistance according to environmental conditions makes a voltage divider bridge formed by this leakage resistance and the fixed pull-up resistance random, making detection of the open and closed states of the key based on a comparison at a single and fixed reference level unreliable.

In patent application FR2724268, VALEO EQUIPEMENT ELECTRIQUES MOTEUR solves this other problem by equipping a circuit for detection of the closure of a contact key for control of a battery charge regulator for an alternator with means for shunting parasitic leakage currents which circulate in this leakage resistance.

In addition, nowadays, ecological considerations are leading motor vehicle manufacturers to ask parts manufacturers to design alternators, an on-board battery charge voltage of which, fixed by a set voltage, is variable, such as for example to limit the torque collected from the thermal engine by the alternator, or to increase it according to a control strategy of an engine control unit.

SUMMARY OF THE INVENTION

The objective of the present invention is to provide a solution to the aforementioned problems known in the prior art, and in particular the problem of the parasitic leakage currents.

According to a first aspect, the invention relates to a device for controlling a regulator of a motor vehicle alternator, of the type comprising firstly a control circuit which generates a command for activation of the regulator, by taking to a first voltage higher than a predetermined high reference voltage a single-wire two-way communication line which is connected to, secondly, a circuit for detection of a state of this activation command.

The detection circuit comprises means for generation of a fault signal from a flag which indicates a fault of the alternator, by connection of the communication line to a ground by at least one semiconductor switching element. By this means, the communication line is taken to a second voltage lower than a predetermined fault voltage lower than the high reference voltage.

The control circuit comprises means for detection of this fault signal.

According to the invention, in a general embodiment, the control circuit also transmits a pulse width modulated set signal with a maximum amplitude which is higher than the high reference voltage, and a minimum amplitude which is lower than a predetermined low reference voltage higher than the fault voltage, a duty cycle of this set signal being representative of a set voltage of the regulator.

According to the invention, the detection circuit designed for this control circuit also comprises a first voltage comparator, activated by means for activation in the absence of a fault of the alternator, which compares a voltage level of the communication line with a first predetermined voltage threshold.

In a first particular embodiment of the invention, the detection circuit also comprises a second voltage comparator which is activated by these activation means in the case of a fault of the alternator, and compares the voltage level of the communication line with a second predetermined voltage threshold.

According to the invention, in this first embodiment, the means for activation are formed by a first AND logic gate which is connected at its input to a first output of the first voltage comparator and to an additional flag of the flag which indicates the fault of the alternator, and by a second AND logic gate which is connected at its input to a second output of the second voltage comparator and to the flag. The first and second AND logic gates are connected at their output to an OR logic gate, such as to reconstitute the set signal emitted by the control circuit in the form of a pulse width modulation (PWM) signal.

Also in this first embodiment of the invention, the detection circuit additionally comprises a differential voltage amplifier which amplifies a difference between the voltage level of the communication line and a third predetermined voltage threshold activated by the flag which indicates the fault of the alternator, and controls the semiconductor switching element.

In a second particular embodiment of the invention, the detection circuit additionally comprises a current comparator which is activated by the means for activation in the event of a fault of the alternator, and compares a value of the current circulating in the semiconductor switching element with a predetermined current threshold.

According to the invention, in this second embodiment, the means for activation are formed by a two-way multiplexer controlled by the flag which indicates the fault of the alternator, and is connected at its input to a first output of the first voltage comparator and to a second output of the current comparator, such as to reconstitute the set signal emitted by the control circuit.

Also in this second embodiment, this current comparator comprises a current mirror for example.

The invention also relates to a motor vehicle alternator of the type comprising an integrated regulator.

According to the invention, this regulator comprises a circuit for detection of a control device as previously described.

These few essential specifications will have made apparent to persons skilled in the art the advantages provided by the invention in comparison with the prior art.

The detailed specifications of the invention are provided in the description which follows in association with the appended drawings.

It should be noted that these drawings serve the purpose simply of illustrating the text of the description, and do not constitute in any way a limitation of the scope of the invention.

DETAILED DESCRIPTION OF THE PREFERRED EMBODIMENT(S)

Figure 1:
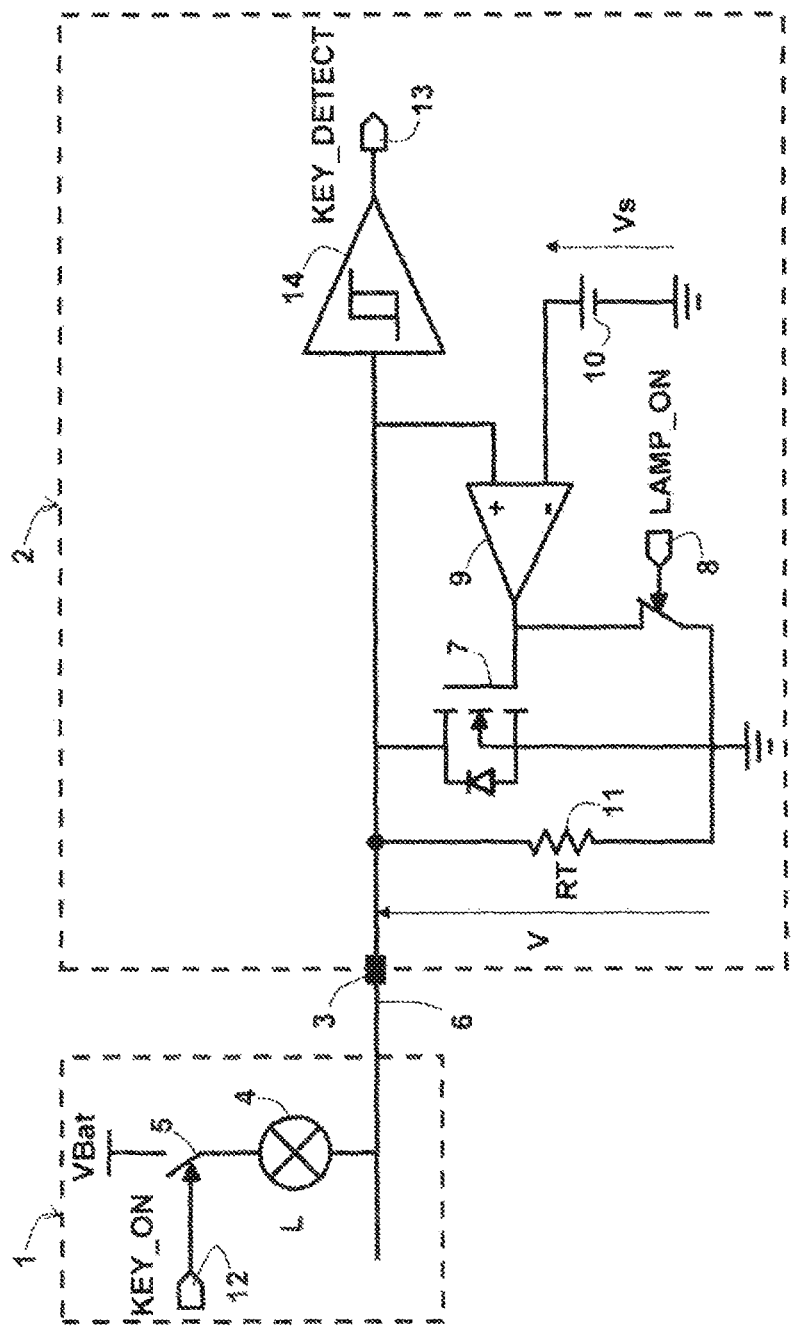
FIG. 1 shows schematically a device for controlling a regulator of a motor vehicle alternator known in the prior art.

For a regulator of a multi-function type known in the prior art, a control device of which is shown in FIG. 1, comprising a control circuit 1 and a detection circuit 2, the functionalities of activation and fault indication are combined on the same connection terminal 3 of the regulator.

This connection terminal 3 is connected to the lamp 4 of the vehicle dashboard and to the key contactor 5, directly or indirectly.

The regulator is activated by detection of a first voltage, corresponding substantially to the battery voltage level Vbat on a communication line 6 which connects the control circuit 1 to the detection circuit 2 during the switching of the key contactor 5.

In order to indicate a fault of the alternator to the driver, the detection circuit 2 of the regulator draws the potential of the communication line 6 to the ground by means of a semiconductor switching element 7, formed by a power transistor of the MOSFET type, controlled by a flag LAMP_ON supplied on a status terminal 8 by the faulty alternator, such as to bring by this means a second voltage of the communication line 6 below a predetermined fault voltage, and to make a current circulate in the communication line 6, making it possible to indicate this fault.

In order not to deactivate the regulator during a fault indication, the voltage level V of the communication line 6 must not drop below a predetermined detection threshold Vs.

This voltage level is then maintained at around 1.2 V for example by a control means 9, 10 of the power transistor 7, formed by a differential amplifier 9 which amplifies a difference between the voltage level of the communication line 6 and the detection threshold Vs supplied by a voltage reference 10 of 1.2 V for example.

When the key 5 is disconnected, no potential is applied to the communication line 6, with a pull-up resistance 11 of approximately 8 KΩ making it possible to bring the potential of the line 6 to a value close to zero.

An activation and deactivation sequence of a regulator of the multi-function or controlled type, known in the prior art, functioning on the principle of a combination of the functions of indicator lamp 4 and starting 5 on the same connection terminal 3, is for example as follows:

During the switching of the key contactor 5 directly by the driver or indirectly by a switching-on signal KEY_ON on a starting terminal 12 going to a high state:

the communication line 6 is supplied via the lamp 4 below the battery voltage VBat, and the voltage level increases;

when the voltage level V exceeds the detection threshold Vs, the activation command KEY_DETECT supplied at an output terminal 13 by a first comparator circuit with a hysteresis 14 goes to the high state.

If the voltage level V of the communication line 6 remains above the detection threshold Vs for a predetermined confirmation period:

the regulator goes from the standby mode to the active mode;

the regulator brings the potential of the communication line 6 to the ground, such as to make a current circulate in the communication line 6 and switch on the indicator lamp 4 in order to indicate that the alternator is not charging the battery;

the voltage level V of the communication line 6 drops, but is maintained by the control means 9, 10 above the detection threshold Vs, and the regulator remains in active mode.

When the vehicle is stopped, the key switch 5 is opened, directly by the driver or indirectly by the switching-on signal KEY_ON on the starting terminal 12 going to a low state:

the control means 9, 10 can no longer maintain the voltage on the communication line 6, and therefore the voltage level V drops below the detection threshold Vs;

the activation command KEY_DETECT supplied to the output terminal 13 by the first comparator circuit 14 returns to the low state.

After the predetermined confirmation period, if the voltage level V on the communication line 6 has remained below the detection threshold Vs:

the regulator returns to the standby mode;

the power transistor 7 which switches the indicator lamp 4 is no longer controlled.

Figure 2:
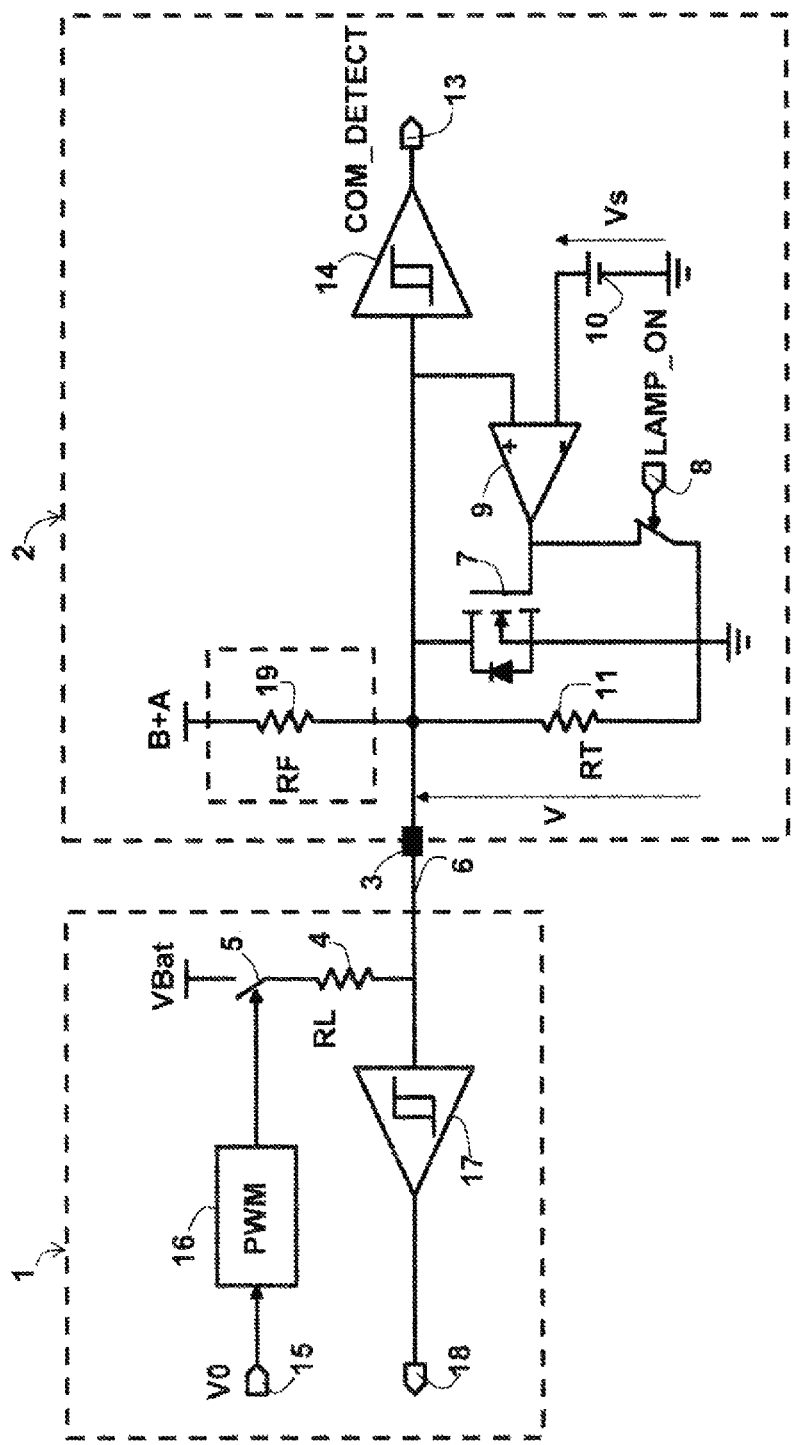
FIG. 2 shows schematically a device for controlling a regulator of a motor vehicle alternator according to the invention, in a general embodiment.

According to the objective of the invention, in order to fulfill the demand for an alternator which supplies a programmable charging voltage, the control device shown in FIG. 1 is modified as shown in FIG. 2 in order to implement a communication protocol between the control circuit 1 and the detection circuit 2, thus allowing an engine control module (not represented) to fix a set voltage V0 of the regulator on a control terminal 15.

The indicator lamp 4 is replaced by a charging resistance 4 of approximately 470Ω for example, and a control circuit 16 which emits a set PWM modulated signal on the communication line 6. The value of the duty cycle corresponds to the voltage regulation set. An amplitude of the set signal depends on the functioning mode of the regulator.

In normal mode without fault indication, the control circuit 16 imposes a first voltage which is higher than a high reference voltage on the communication line 6. When the high pull-up is released by the control circuit 16, the pull-up resistance 11 at the ground of the regulator brings the voltage level V on the communication line 6 down to a second voltage which is lower than a low reference voltage, close to 0 V.

When the regulator indicates an alternator fault, a maximum of the set signal is limited to the detection threshold Vs, i.e. to 1.2 V for example, by the control means 9, 10 of the power transistor 7, whereas a minimum of this set signal is brought below the fault voltage, to substantially 0 V, both by the power transistor 7 and the ground pull-up resistance 11.

In the general embodiment of the invention shown in FIG. 2, the set signal is detected by the regulator without modification of its detection circuit 2, compared with the assembly known in the prior art shown in FIG. 1.

In fact, in the two functioning modes, the voltage level at the communication line 6 drops to 0 V, and intersects the threshold Vs of detection of closure of the key 5. The set signal emitted by the control circuit 16 can therefore be detected by the first comparator circuit 14, reconstituted on the output terminal 13 and sent to a logic control circuit of the regulator, which must be designed to be able to calculate the set voltage V0 to be applied to the alternator starting from this signal COM_DETECT detected.

Since the battery charging indicator lamp 4 on the vehicle dashboard is no longer switched directly by the detection circuit 2 of the regulator, the control circuit 1 must be able to detect the pull-up to below the fault voltage, i.e. to less than 1 V, of the communication line 6, during the indication of the alternator fault. For this purpose, a second comparator circuit 17 with a hysteresis placed in the control circuit 1 detects the absence of activity on the communication line 6, and can transmit this information to a passenger space control module (not represented) via a signalling terminal 18.

Transmission to the regulator of the set voltage V0 supplied by the engine control module, and indication of the fault transmitted by the regulator to the passenger space control module can be simultaneous: the communication line 6 between the control circuit 1 and the detection circuit 2 is a connection of the full duplex type.

The sequence of activation and deactivation of a regulator, of the multi-function or controlled type, of a programmable alternator according to the invention, in the general embodiment of the control device represented in FIG. 2, is typically as follows:

the activator of the regulator is identical to that of the non-programmable multi-function regulator;

when the control circuit 1 releases the communication line 6, the regulator does not return immediately to standby mode. The regulator remains active, waiting for a new rising front on the communication line 6;

in the following cycle of the set signal, the duty cycle is determined then interpreted by the logic control circuit of the regulator, which applies a required control law;

the regulator returns to standby mode provided that the voltage level on the communication line 6 remains below the detection threshold Vs during the predetermined confirmation period.

The disadvantage of this general approach is its sensitivity to the leakage currents which can appear during the service life of the control device 1, 2 between a power terminal B+A of the alternator which supplies the battery and the connection terminal 3 of the regulator to the control circuit 1, for example because of a saline bridge with the type of problem already indicated in the preamble.

In normal functioning mode, the equivalent leakage resistance 19 tends to raise the voltage level on the communication line 6 in a low state of the set signal. The effect can be that the minimum of the set signal is always higher than the low reference voltage, and therefore the duty cycle of the set signal can no longer be interpreted. The regulator may also no longer return to standby mode during passive life cycles of the vehicle, which would contribute towards discharging the battery.

In order to eliminate this disadvantage, the specifications of the communication protocol take into account a possible increase in the voltage level V in the low state of the set signal in normal functioning mode, by selecting in an appropriate manner the high and low reference voltages, as well as the fault voltage.

In the preferred embodiments of the invention, the high reference voltage is equal to 3.5 V for example, the low reference voltage is equal to 1.5 V for example, and the fault voltage is approximately 1 V.

The minimum of the set signal is therefore contained between 0 V and 1.5 V for example according to these specifications in normal functioning mode. However in the case of a fault, the voltage level V is always lower than 1 V. There is therefore no detection range common to the two functioning modes. As a result, two detection methods are implemented in the detection circuit 2 of the control device 1, 2 of a regulator according to the invention, i.e. one when the amplitude of the signals is large, and the other in fault mode with lower voltage levels.

Figure 3:
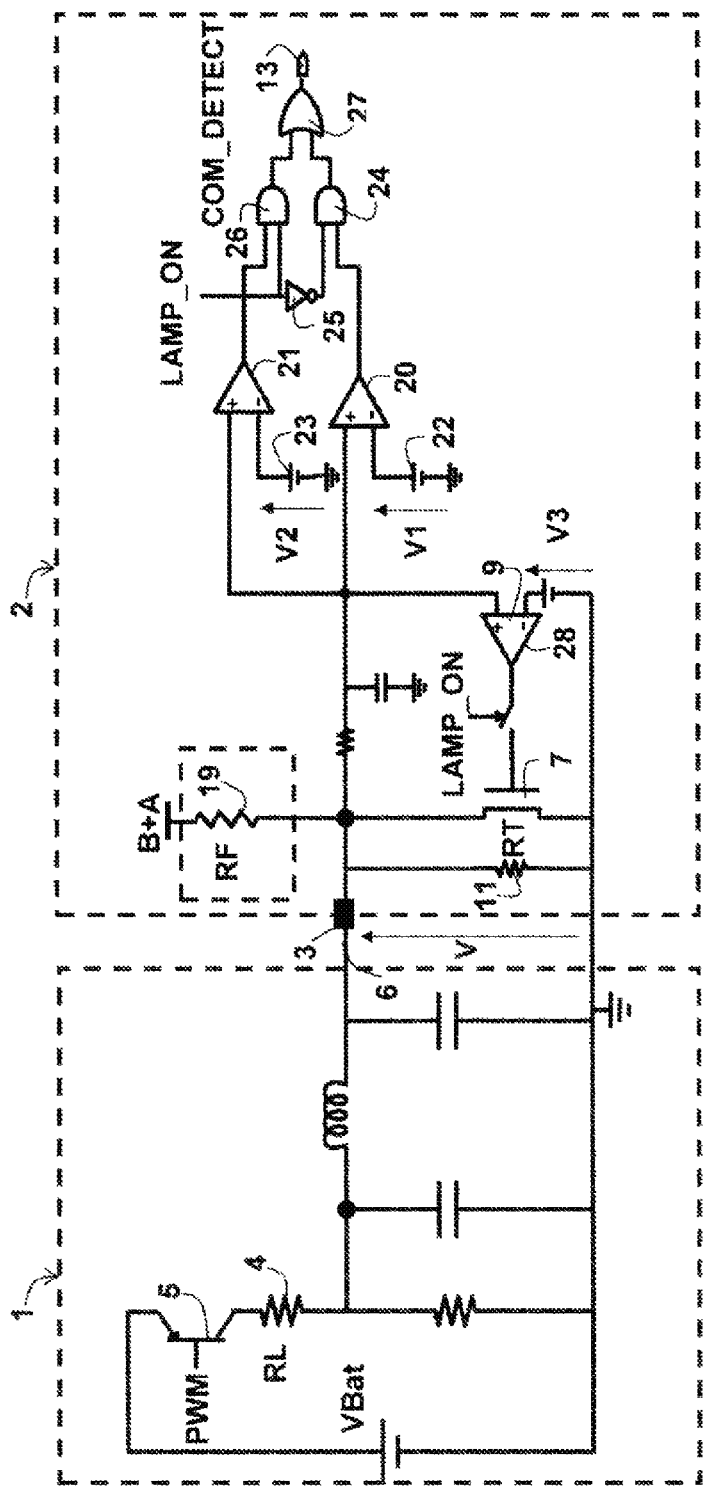
FIG. 3 shows schematically part of a device for controlling a regulator of a motor vehicle alternator according to the invention, in a first particular embodiment.

In a first particular embodiment shown schematically in FIG. 3, the detection circuit 2 comprises first and second voltage comparators 20, 21 for the set signal in the two functioning modes.

In normal mode, the first voltage comparator 20 compares the voltage level V on the communication line 6 with a first predetermined voltage threshold V1 of 2.5 V supplied by a first reference source 22.

In fault indication mode, the second voltage comparator 21 compares the voltage level V on the communication line 6 with a second predetermined voltage threshold V2 of 0.65 V supplied by a second reference source 23.

The reconstituted set signal COM_DETECT is supplied to the output terminal 13 by the first voltage comparator 20 or the second voltage comparator 21 according to the mode.

For this purpose, the detection circuit 2 comprises:

a first AND logic gate 24 which is connected at its input to a first output of the first voltage comparator 20 and to a complementary flag of the flag LAMP_ON formed by an inverter 25;

a second AND logic gate 26 which is connected at its input to a second output of the second voltage comparator 21 and to the flag LAMP_ON;

an OR logic gate 27 which is connected at the output of the first and second AND logic gates, in order to supply the reconstituted set signal COM_DETECT.

In this first embodiment, the differential voltage amplifier 9 which controls the power transistor 7 amplifies the difference between the voltage level V of the communication line 6 and a third predetermined voltage threshold V3 of 0.9 V supplied by a third reference source 28.

Figure 4:
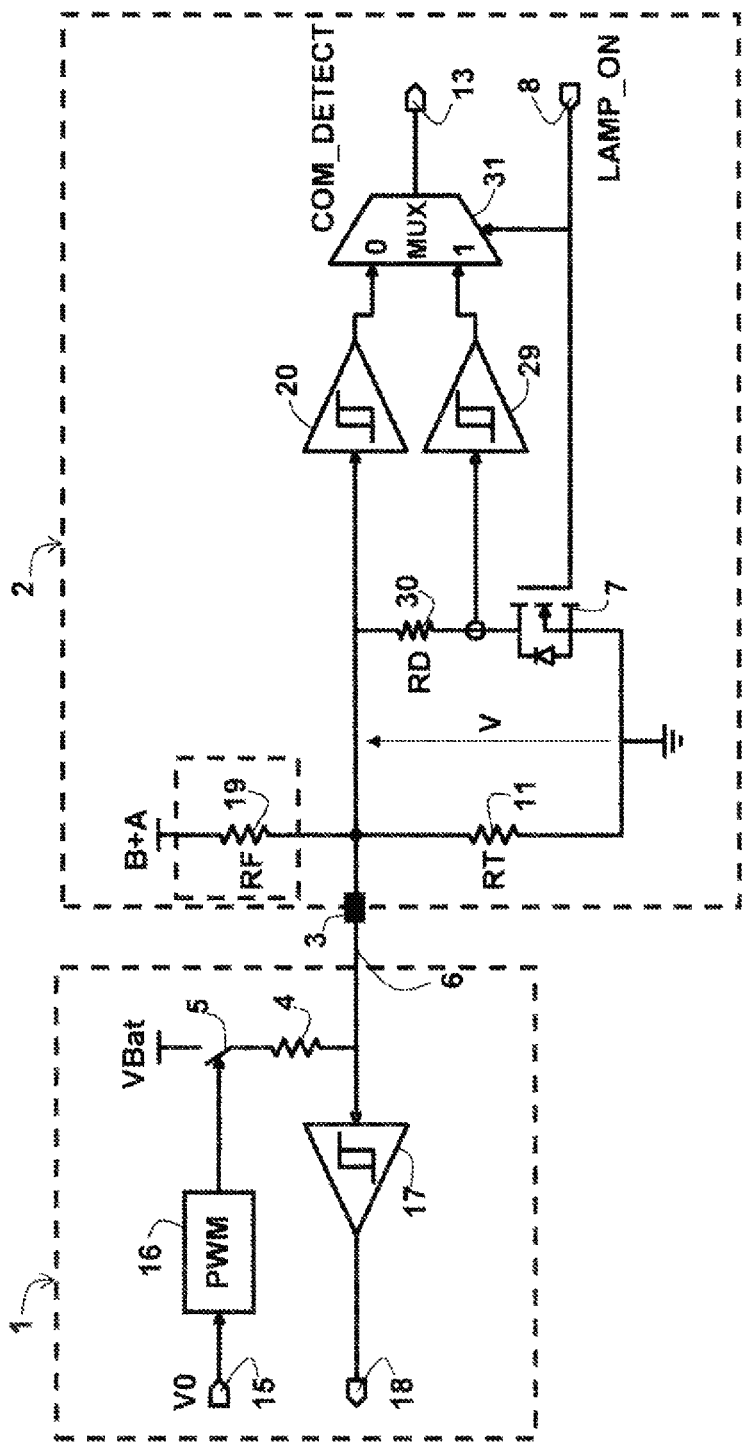
FIG. 4 shows schematically a device for controlling a regulator of a motor vehicle alternator according to the invention, in a second particular embodiment.

A second particular embodiment of the invention shown schematically in FIG. 4 provides a response in this case.

In this second particular embodiment, the detection circuit 2 comprises the first voltage comparator 20 already implemented in the first embodiment of the invention in order to detect the set signal in normal functioning mode.

The voltage detection threshold is ideally situated above the ground offsetting voltage and below the high reference voltage.

The high reference voltage equal to 3.5 V and the low reference voltage equal to 1.5 V of the communication protocol are mostly suitable by selecting without modification the first predetermined voltage threshold with which the voltage level of the communication line equal to 2.5 V is compared.

In order to carry out reliable detection in the event of a fault of the activation command, independently from the ground offsetting voltage, the detection circuit 2 comprises a current comparator 29.

This current comparator 29 carries out a comparison between a current value circulating in the power transistor 7, switching the communication line 6 to the ground via a drain resistance 30 of approximately 100Ω, and a predetermined current threshold. This current threshold corresponds to a minimum value of the current which makes it possible to bring the voltage level V on the communication line 6 to the fault voltage, i.e. 1 V.

In a known manner, the current comparator 29 comprises a current mirror, i.e. it comprises a signal transistor of a type identical to the power transistor 7, but with smaller dimensions, connected in parallel on the power transistor 7. It is therefore a drain-source current of this signal transistor, proportional to the current circulating in the power transistor 7, which makes possible the comparison with the predetermined current threshold.

During the change of its state to fault indication mode, the regulator switches from implementation of the first voltage comparator 20 to implementation of the current comparator 29 for reading of the duty cycle.

The set signal COM_DETECT is reconstituted on the output terminal 13 by a two-way multiplexer 31 controlled by the flag LAMP_ON and connected at its input to a first output of the first voltage comparator 20 and to the current comparator 29.

In order for the duty cycle of the set signal to be interpreted correctly, the output signals of the first voltage comparator 20 and of the current comparator 29 must overlap at the moment of switching between functioning modes. Thus, the discontinuity will be minimised in the reading of the duty cycle. For this purpose, the switching from the normal mode to the fault mode is synchronised with a low state of the set signal.

In the general embodiment and the first and second particular embodiments of the invention, the detection circuit 2 of the control device 1, 2 of a regulator according to the invention is produced in the form of an ASIC (Application Specific Integrated Circuit).

This type of integrated circuit makes it possible to comply easily with the various specifications to be fulfilled for the motor vehicle manufacturers, concerning in particular the communication protocol, and relating to the high reference voltage, the low reference voltage, and the fault voltage, in order to comply with all the demands of new generation programmable alternators.

It will be appreciated that the invention is not limited simply to the above-described preferred embodiments.

In particular, the values of the passive electronic components, such as the resistances 4, 11, 19, 30, and the types of active electronic components 7, 9, 14, 17, 20, 21, 24, 25, 26, 27, 28, 29, 31 indicated are simply examples: persons skilled in the art will use other electronic components as required in order to fulfill the same functions.

The invention thus incorporates all possible variant embodiments, provided that these variants remain within the context defined by the following claims.

The invention claimed is:

1. Device (1, 2) for controlling a regulator of a motor vehicle alternator, of the type comprising firstly a control circuit (1) which generates a command (KEY_ON) for activation of said regulator, by taking to a first voltage higher than a predetermined high reference voltage a single-wire two-way communication line (6) which is connected to, secondly, a circuit (2) for detection of a state (KEY_DETECT) of said activation command (KEY_ON), said detection circuit (2) comprising means (7, 9) for generation of a fault signal from a flag (LAMP_ON) which indicates a fault of said alternator, by connection of said communication line (6) to a ground by at least one semi-conductor switching element (7), by this means taking said communication line (6) to a second voltage lower than a predetermined fault voltage lower than said high reference voltage, and said control circuit (1) comprising means (4) for detection of said fault signal, wherein said control circuit (1) also transmits a pulse width modulated set signal with a maximum which is higher than said high reference voltage, and a minimum which is lower than a predetermined low reference voltage higher than said fault voltage, a duty cycle of said set signal being representative of a set voltage (V0) of said regulator.

2. Device (1, 2) for controlling a regulator of a motor vehicle alternator according to claim 1, wherein said detection circuit (2) additionally comprises a first voltage comparator (20), activated by means (24, 25) for activation in the absence of a fault of said alternator, and comparing a voltage level (V) of said communication line (6) with a first predetermined voltage threshold (V1).

3. Device (1, 2) for controlling a regulator of a motor vehicle alternator according to claim 2, wherein said detection circuit (2) also comprises a second voltage comparator (21) which is activated by said activation means (26) in the case of a fault of said alternator, and compares said voltage level (V) of said communication line (6) with a second predetermined voltage threshold (V2).

4. Device (1, 2) for controlling a regulator of a motor vehicle alternator according to claim 3, wherein said means (24, 25, 26) for activation are formed by a first AND logic gate (24) which is connected at its input to a first output of said first voltage comparator (20) and to an additional flag of said flag (LAMP_ON), and by a second AND logic gate (26) which is connected at its input to a second output of said second voltage comparator (21) and to said flag (LAMP_ON), said first and second AND logic gates (24, 26) being connected at their output to an OR logic gate (27), such as to reconstitute said set signal (COM_DETECT).

5. Device (1, 2) for controlling a regulator of a motor vehicle alternator according to claim 4, wherein said detection circuit (2) additionally comprises a differential voltage amplifier (9) which amplifies a difference between said voltage level (V) of said communication line (6) and a third predetermined voltage threshold (V3) activated by said flag (LAMP_ON), and controlling said switching element (7).

6. Motor vehicle alternator of the type comprising an integrated regulator, wherein said regulator comprises a detection circuit (2) of a control device (1, 2) according to claim 4.

7. Device (1, 2) for controlling a regulator of a motor vehicle alternator according to claim 3, wherein said detection circuit (2) additionally comprises a differential voltage amplifier (9) which amplifies a difference between said voltage level (V) of said communication line (6) and a third predetermined voltage threshold (V3) activated by said flag (LAMP_ON), and controlling said switching element (7).

8. Motor vehicle alternator of the type comprising an integrated regulator, wherein said regulator comprises a detection circuit (2) of a control device (1, 2) according to claim 7.

9. Motor vehicle alternator of the type comprising an integrated regulator, wherein said regulator comprises a detection circuit (2) of a control device (1, 2) according to claim 3.

10. Device (1, 2) for controlling a regulator of a motor vehicle alternator according to claim 2, wherein said detection circuit (2) additionally comprises a current comparator (29) which is activated by said means (31) for activation in the event of a fault of said alternator, and comparing a value of the current circulating in said switching element (7) with a predetermined current threshold.

11. Device (1, 2) for controlling a regulator of a motor vehicle alternator according to claim 10, wherein said means (31) for activation are formed by a two-way multiplexer (31) controlled by said flag (LAMP_ON), and connected at its input to a first output of said first voltage comparator (20) and to a second output of said current comparator (29), such as to reconstitute said set signal (COM_DETECT).

12. Device (1, 2) for controlling a regulator of a motor vehicle alternator according to claim 11, wherein said current comparator (29) comprises a current mirror.

13. Motor vehicle alternator of the type comprising an integrated regulator, wherein said regulator comprises a detection circuit (2) of a control device (1, 2) according to claim 11.

14. Device (1, 2) for controlling a regulator of a motor vehicle alternator according to claim 10, wherein said current comparator (29) comprises a current mirror.

15. Device (1, 2) for controlling a regulator of a motor vehicle alternator according to claim 14, wherein said high and low predetermined reference voltages, said fault voltage, and said first, second and third predetermined voltage thresholds are respectively substantially 3.5 V, 1.5 V, 1.0 V, 2.5 V, 0.65 V and 0.9 V.

16. Motor vehicle alternator of the type comprising an integrated regulator, wherein said regulator comprises a detection circuit (2) of a control device (1, 2) according to claim 15.

17. Motor vehicle alternator of the type comprising an integrated regulator, wherein said regulator comprises a detection circuit (2) of a control device (1, 2) according to claim 14.

18. Motor vehicle alternator of the type comprising an integrated regulator, wherein said regulator comprises a detection circuit (2) of a control device (1, 2) according to claim 10.

19. Motor vehicle alternator of the type comprising an integrated regulator, wherein said regulator comprises a detection circuit (2) of a control device (1, 2) according to claim 2.

20. Motor vehicle alternator of the type comprising an integrated regulator, wherein said regulator comprises a detection circuit (2) of a control device (1, 2) according to claim 1.

* * * * *